Figure 1:
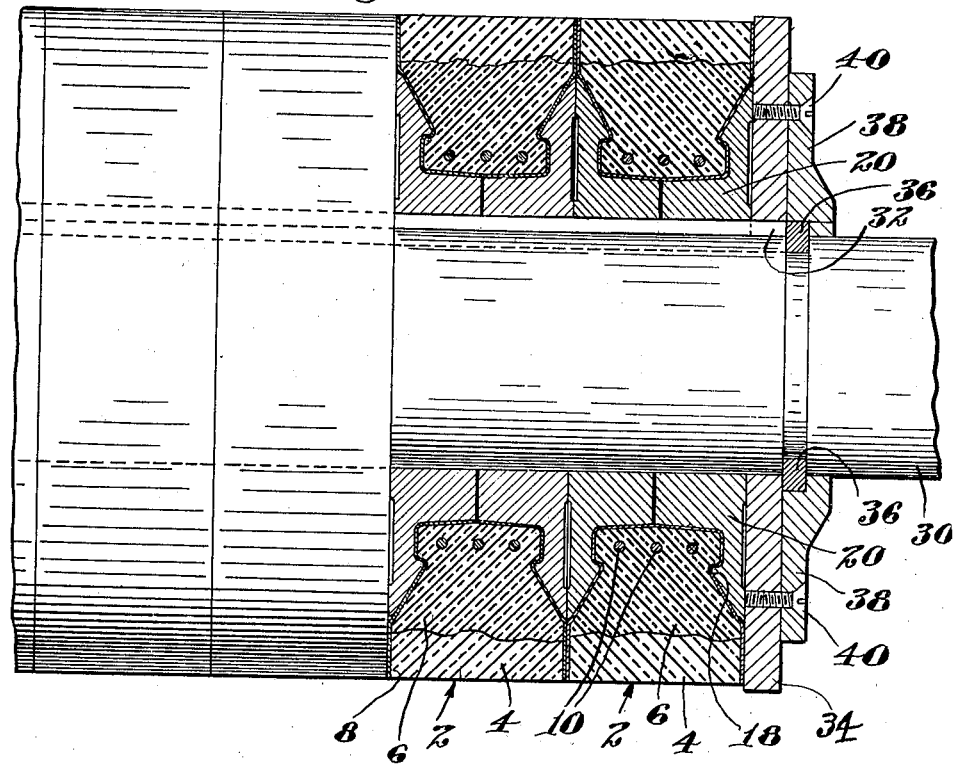

Jan. 12, 1926.

H S. CRYSLER

SECTIONAL ROLL FOR WRINGING MACHINES

Filed Jan. 23, 1925

1,569,536

Inventor

H. Stanley Crysler

Patented Jan. 12, 1926.

1,569,536

UNITED STATES PATENT OFFICE.

H STANLEY CRYSLER, OF LOWELL, MASSACHUSETTS, ASSIGNOR OF FIFTY ONE-HUN-DREDTHS TO ROBERT J. WILKIE, OF NEWTON, MASSACHUSETTS.

SECTIONAL ROLL FOR WRINGING MACHINES.

Application filed January 23, 1925. Serial No. 4,198.

*To all whom it may concern:*

Be it known that I, H STANLEY CRYSLER, a citizen of the United States, residing at Lowell, in the county of Middlesex and State of Massachusetts, have invented certain new and useful Improvements in Sectional Rolls for Wringing Machines, of which the following is a specification.

This invention relates to improvements in sectional rolls for wringing machines and the like and has for its object to provide a new and more durable and efficient squeezing or wringing roller.

A chief defect in squeeze rolls of the sectional type in the past has been the liability of the individual sections to slip and turn with reference to the shaft upon which they are mounted and with reference to each other, such slippage resulting in greatly reducing the life of the roll. The principal type of such rolls in use today is that described in United States Letters Patent to Burnham, No. 900,055, according to which the metallic ring members upon which the rubber sections are seated are provided with radial lugs engaging in corresponding recesses formed in the rubber sections, the purpose of which lugs is to insure that the rubber sections shall turn with the rings upon which they are mounted, the rings being keyed to the shaft. Previous types of rolls in which frictional engagement between the rubber sections and the metallic rings upon which they were mounted was alone depended upon to cause the rubber sections to rotate with the rings have not proved successful for heavy duty work, such as in wool washing machines.

It is the object of this invention to do away with the necessity of supplying radial lugs and mating depressions in the rubber sections, which inevitably weaken the roll to some extent, and to provide means whereby frictional engagement between the parts may be made adequate to accomplish the desired result of preventing slippage between the rubber sections and the metal rings upon which they are seated. I have found that by the use of the means hereinafter described, I am enabled to avoid the necessity of using any lugs such as are shown in said Burnham patent, and nevertheless to produce a squeeze roll which, depending solely upon frictional engagement to prevent slippage between the parts, is entirely adequate to the purpose and superior to all other types of squeeze rolls with which I am familiar.

Figure 2:
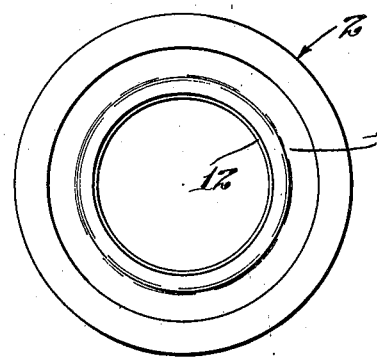
Figure 3:
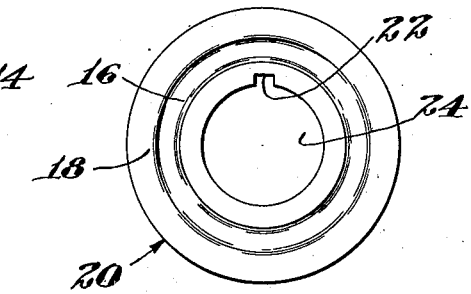

In the drawings in which like numbers represent like parts:

Fig. 1 is an elevation, partly in section, showing a portion of the complete assembled roll ready for use; and Fig. 2 is a side elevation of a rubber section made in accordance with this invention; and Fig. 3 is a side elevation of the section gripping surface of a metallic ring member which is adapted to fit and hold a section such as that shown in Fig. 2.

Referring to the drawings and more particularly to Fig. 1; 2, 2, designate generally the rubber sections which are of annular or ring-like form circularly recessed on their sides and are preferably made of rubber of two or more densities and compositions, for example, a relatively soft rubber in the peripheral portion 4, and a denser rubber in the central portion 6, the two kinds of rubber being integrally united or vulcanized into one unitary section. The sections 2, 2, have as a part of their exterior or cover a suitable fabric 8, for example, canvas which may be vulcanized or bonded to the rubber, the fabric here being shown as extending to the peripheral or wringing surface of the sections though it may terminate at a point short of the said surface. It has been found that this fabric, among other advantages, enables the ring members to grip and hold the sections without the use of lugs by reason of the frictional engagement of the fabric on the section with the metal flange member. If, for any reason, a section should turn slightly, the fabric prevents the rubber from being injured or disintegrated during the turning and will cause the section to bind fast and operate as it should. The section construction here shown, without the radial recesses for lugs, have wires 10, 10, embedded in and vulcanized into the bases. These wires 10, 10 resist the radial, outward thrust upon the rubber section caused by the insertion within the rubber section of the longitudinally extending hub portions of the metallic rings 20 upon which the rubber sections are seated with a tight fit, and cooperate therewith to create a firm frictional engagement between the interior surfaces of the rubber sections and said hub portions of the metal rings upon which they are seated. Thus the sections as the result of the application of the assembling pressure are firmly gripped at their bases as well as upon their side surfaces, by the metallic ring members. Each of the sections 2 here illustrated have their inner surfaces made up of two intersecting frusto-conical surfaces 12 and having recessed side surfaces 14 which are adapted to be gripped by the projecting hook-like portions 18 of the ring members 20 two of which ring members grip each section 2 on opposite sides, with the back or reverse sides of the ring members 20 in contact with each other when the assembling pressure is applied as clearly shown in Fig. 1. The ring members are of a new and improved shape and are somewhat larger in diameter than those heretofore used. The rubber sections are so formed and held that practically all of the gripping or lateral compression strain is upon the rubber to metal contacts between the sections and ring members where the rubber takes the heavier strain, rather than upon the rubber to rubber contacts of adjacent sections. This is accomplished by having the section of such width or thickness adjacent its peripheral portion that the periphery is not materially bulged outwardly when compressed or in wringing. Thus the wringing surface though necessarily under considerable side pressure does not have to withstand the extreme endwise or side pressure to which the balance of the section is subjected and thus the wringing surface of each section is not bulged outwardly and can give inwardly and radially more easily than is the case with the surface of rolls in current use.

The ring members are provided with a key-way 22 and central opening 24 which are adapted to fit the shaft 30 and key 32 so the ring members are positively turned by any rotation of the shaft.

The rubber sections and ring members upon being placed upon shaft are subjected to heavy end pressure of several tons, for example 10 to 20 tons, and then locked in place at both ends by any suitable means. The device here shown to hold the sections and ring members in place may be used at either or both ends of the assembled group of sections and flanges and consists of an annular plate or end flange 34 which having been axially pressed to proper position is held in place by a split or two part locking ring 36 seated in an annular circumferential groove in the shaft 30. An annular plate 38 having a recessed portion to fit the locking ring holds the locking ring in place, the plate itself being held to the end flange 34 by screws 40. Each section is made of a suitable thickness so that it will be firmly gripped and held between two ring members when the latter are pressed together, the aggregate thickness of each pair of ring members being such that they nearly or barely touch each other underneath the section when the latter has been suitably compressed for service (see Fig. 1). Thus in the event that one or more rubber sections should break away the remaining sections will still be held compressed and securely gripped thereby allowing the roll to be operated without injury to the remaining sections until such time as it is convenient to shut down the machine and remove the roll for the replacement of the section or sections which failed. It is important that the sections be under a heavy pressure to prevent turning or slipping and that the pressure be uniform and applied from the ends of the assembled group.

It will be apparent to those skilled in the art that the improved construction above described has many advantages in addition to those set forth. It is essential to make a durable roll and my improved roll has a decided advantage in this respect. At the same time it is desirable to provide a roll with a comparatively soft and hence a better squeezing and wringing surface. Previous devices have always been the result of a compromise between the two, that is, it has not been practicable to hold the softer and more desirable rubbers so it has been necessary to use the less desirable harder rubbers.

In my use of the word "rubber" in this specification and the following claims, I do not confine myself to what is strictly and technically rubber but intend that it shall include various mixtures and compounds of rubber and/or fibre, etc., which answer the purpose for a roll of this general character.

Having described my invention, what I desire to claim and secure by Letters Patent is:—

1. A roll of the class described having, in combination, a group of ring-like rubber sections, a central shaft upon which said sections are mounted, said sections having their exterior peripheral surfaces composed of rubber of less density than the rubber in the base portions of the same, a series of metallic members interposed between each of said sections and the shaft and locked in turn with said shaft, said sections being held by and compressed between adjacent flanges by pressure oppositely applied to and maintained against the respective ends of said group, the harder base of the sections being formed to withstand the major part of the compression.

2. A roll of the class described having a central shaft member, a series of metallic ring members locked to turn with said shaft member, a series of ring-like rubber sections each seated upon and embraced between a pair of said ring members, and wires embedded in the base portions of said rubber sections adapted to resist outward radial pressure of said ring members upon said sections.

3. A roll of the class described having a central shaft member, a series of metallic ring members locked to turn with said shaft member, a series of annular rubber sections each seated upon and embraced between a pair of said metallic members, wires embedded in the base portions of said rubber sections adapted to resist outward radial pressure of said ring members upon said sections, and fabric attached to said rubber sections on portions thereof which contact with said metallic members.

4. A roll of the class described having a central shaft member, a series of flanged metallic ring members locked to turn with said shaft member, a series of annular rubber sections each seated upon and embraced between a pair of said metallic members, said rubber sections having fabric attached to those portions thereof which make contact with said metallic members, the said rubber sections at their bases being so formed that the base portions are subjected to greater pressure than the peripheral portions when the parts are assembled, and means for locking said series of rubber sections and metallic members under longitudinal pressure on said shaft.

5. A roll of the class described having in combination, a central shaft member, metallic ring members upon said shaft member and keyed to turn with the same, a series of annular rubber sections having fabric vulcanized to the sides of the same each mounted upon and embraced between a pair of said ring members and held to turn by frictional engagement only, and means for maintaining said series of rubber sections and said metallic rings under longitudinal pressure on said shaft whereby said sections and rings are held in firm frictional engagement by said pressure maintained against the respective ends of said series.

6. A roll as claimed in claim 5 having wires embedded in the base portions of said rubber sections adapted to resist outward radial pressure of said ring members upon said sections.

7. A roll of the class described having in combination, a central shaft member, metallic ring members upon said shaft member and keyed to turn with the same, a series of annular rubber sections having wires embedded in the base portions of said rubber sections and adapted to resist outward radial pressure of said ring members upon said sections, each mounted upon and embraced between a pair of said ring members and held to turn by frictional engagement only, and means for maintaining said series of rubber sections and said metallic rings under longitudinal pressure on said shaft whereby said sections and rings are held in firm frictional engagement solely by said pressure maintained against the respective ends of said series.

H STANLEY CRYSLER.